United States Patent
Brunel et al.

(10) Patent No.: US 8,085,716 B2
(45) Date of Patent: Dec. 27, 2011

(54) METHODS AND DEVICES FOR DETERMINING IF A BASE STATION CAN NOT HANDLE A TERMINAL

(75) Inventors: Loic Brunel, Rennes Cedex (FR); Alain Mourad, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 12/364,835

(22) Filed: Feb. 3, 2009

(65) Prior Publication Data

US 2009/0207760 A1    Aug. 20, 2009

(30) Foreign Application Priority Data

Feb. 15, 2008 (EP) .................................... 08002823

(51) Int. Cl.
*H04W 4/00* (2009.01)

(52) U.S. Cl. ........................................ 370/328; 370/331

(58) Field of Classification Search .......... 370/310–350; 455/421–426.2, 436–444
See application file for complete search history.

(56) References Cited

U.S. PATENT DOCUMENTS

| | | | | |
|---|---|---|---|---|
| 5,917,811 | A * | 6/1999 | Weaver et al. | 370/332 |
| 6,026,301 | A * | 2/2000 | Satarasinghe | 455/436 |
| 7,260,399 | B1 * | 8/2007 | Oh et al. | 455/436 |
| 2004/0152480 | A1 * | 8/2004 | Willars et al. | 455/513 |
| 2005/0192011 | A1 * | 9/2005 | Hong et al. | 455/440 |
| 2005/0239410 | A1 * | 10/2005 | Rochester, III | 455/67.11 |
| 2007/0019667 | A1 * | 1/2007 | Mottier et al. | 370/458 |
| 2008/0219234 | A1 * | 9/2008 | Bolgiano et al. | 370/342 |
| 2008/0227455 | A1 * | 9/2008 | Kim | 455/436 |
| 2008/0232278 | A1 * | 9/2008 | Brunel et al. | 370/275 |
| 2009/0147742 | A1 * | 6/2009 | Tsai et al. | 370/329 |
| 2009/0191858 | A1 * | 7/2009 | Calisti et al. | 455/422.1 |
| 2009/0274086 | A1 * | 11/2009 | Petrovic et al. | 370/312 |
| 2010/0103899 | A1 * | 4/2010 | Kwak et al. | 370/329 |
| 2010/0311440 | A1 * | 12/2010 | Rakanovic et al. | 455/456.1 |

FOREIGN PATENT DOCUMENTS

EP    1 746 743 A1    1/2007

OTHER PUBLICATIONS

"Idle period shortening for half duplex communications in large cells", Mitsubishi Electric, $3^{RD}$ Generation Partnership Project Techinical specifiation Group (TSG) Radio Access Network (RAN), vol. R1-051180, Oct. 10, 2005, 7 pages, XP003019664.

(Continued)

*Primary Examiner* — Kwang B Yao
*Assistant Examiner* — Kenan Cehic
(74) *Attorney, Agent, or Firm* — Oblon, Spivak, McClelland, Maier & Neustadt, L.L.P.

(57) ABSTRACT

A method for determining, in a wireless cellular telecommunication network, if a base station can handle a half-duplex terminal. The base station transfers signals in a cell of the base station, and the half-duplex terminal, when being handled by the base station, does not transfer or receive signals during a period of time, called idle period of the cell of the base station. If a characteristic of the terminal is not compatible with the idle period of the cell of the base station, it is determined that the base station cannot handle the terminal.

10 Claims, 9 Drawing Sheets

OTHER PUBLICATIONS

"UE-specific idle period for half-duplex communications", Mitsubishi Electric, Internet Citation, Apr. 17, 2007, 8 Pages, XP-002494760.

"UE-specific idle period for half-duplex communications", Mitsubishi Electric et al, Internet Citation, Aug. 27, 2006, pp. 1-11, XP-002494759.

U.S. Appl. No. 12/364,750, filed Feb. 3, 2009, Brunel, et al.

* cited by examiner

METHODS AND DEVICES FOR DETERMINING IF A BASE STATION CAN NOT HANDLE A TERMINAL

The present invention relates generally to methods and devices for determining, in a wireless cellular telecommunication network, if a base station can not handle a terminal.

When a terminal is trying to connect to a wireless cellular telecommunication network, several base stations may be available for handling the terminal. An initial cell-search procedure is therefore required from the terminal so as to synchronise its receiver to a base station that is capable of handling the terminal, i.e. be able to enable the terminal to communicate with other telecommunication devices through the base station. The handling of a new terminal by a specific base station is then decided so as to optimise the global network efficiency.

Similarly, the handling of a terminal by another base station may be decided during communication according to a so-called handover procedure.

The quality of the channel between a terminal and a base station may vary according to the propagation environments like the distance between the terminal and the base station, the presence of obstacles etc.

Initial cell-search procedure requires the detection by the terminal, of signals in the downlink channel, more precisely in a measurement channel such as, as example, a synchronisation channel, a pilot channel or a data channel. Each base station regularly transfers that signal. The signals in different measurement channels may be detected and the quality of these signals is evaluated by the terminal. The terminal may then store the measurements of the quality of these signals.

Initial cell-search procedure consists in identifying the base station which signals are received with the best quality, e.g. which signals received by the terminal from the base station have a power strength upper than a predetermined value and/or higher than the power strength of signals transferred by other base stations.

Once this base station has been identified, a random access procedure is initiated by the terminal towards the identified base station through a contention-based channel, i.e. a channel that is accessible to any terminal with no reservation mechanisms.

The base station identifies the new terminal and sends to the terminal downlink-specific control information for communication establishment (e.g., resource reservation, uplink synchronisation mismatch, etc.).

Classically, a candidate set of base stations which could in theory handle the communication is regularly assigned to each terminal. These candidate base stations may be for instance base stations surrounding the base station which is currently handling the terminal. Each terminal regularly measures, or measures on demand, i.e. after a particular event, the quality of the signals in the measurement channels of the different candidate base stations. These measurements are then reported by the terminal to the base station which is currently handling the terminal, which may decide whether to start a handover procedure.

Alternatively, a candidate set of base stations is not assigned to the terminals. Each terminal performs measurements with the base stations from which it measures signals with enough quality. Then, the terminal reports the measurements to the base station which is currently handling the terminal, which may decide whether to start a handover procedure.

Such a state-of-the-art handover, as well as initial cell search procedures, are valid for full-duplex terminals but may lead to some issues for half duplex terminals.

A full-duplex terminal is a terminal which is able to transmit and receive radio signals simultaneously.

A half-duplex terminal is a terminal which is not able to transmit and receive radio signals simultaneously. For instance, the terminal operates in Time Division Duplex (TDD) mode, with transmission and reception on the same frequency band but at different time periods. The terminal may also operate Frequency Division Duplex (FDD) mode, with transmission and reception on different frequency bands and at different time periods.

When a base station transmits symbols at time te to a half-duplex terminal, these symbols are received by the terminal located at a distance d from the base station at a time equal to te+RTD(d)/2, where RTD(d) is the Round Trip Delay for the terminal. These symbols are processed by the terminal which then may transmit also symbols over the uplink channel to the base station. Before transmitting symbols over the uplink channel, the terminal TE has to wait for a period of time, said Receive Transmit Switch time or simply switching time and referred to as RTS, in order to take into account the duration of hardware and software operations. For instance, this delay RTS is the maximum of the time needed by hardware equipments of the terminals to switch between reception and transmission modes and the time needed by hardware equipments of the base station to switch between transmission and reception modes. Thus, the symbols transmitted over the uplink channel cannot be received at the base station BTS before a time tr equal to te+RTD(d)+RTS+$D_{DL}$, $D_{DL}$ being the total duration of the symbols the terminal can receive in the downlink channel.

As example, if we consider a base station having a FDD cell radius of 10 km which is compatible with the Third Generation Partnership Project Long Term evolution (3GPP/LTE), an idle period duration which corresponds to two symbols duration needs to be created, either at both the base station and the terminal sides or only at the terminal side in order to make the base station able to handle terminals located at any position in the cell. An idle period duration which corresponds to two symbols duration allows half-duplex terminals located at a distance from the base station up to 19.6 km to be handled by the base station.

An idle period duration which corresponds to one symbol duration allows only half-duplex terminals located at a distance from the base station up to 8.3 km to be handled by the base station.

With an idle period duration which corresponds to one symbol duration, even if the quality of the signals of the measurement channel is sufficiently high, a half duplex terminal located at a distance larger than 8.3 km from the base station can not be handled by the base station whereas a full-duplex terminal could.

It has to be noted here that an idle period may be a continuous or a discontinuous time period as it will be disclosed hereinafter.

Similarly, during communication, a handover procedure may be requested towards a base station whereas the half-duplex terminal can not be handled by the base station as being too far from it.

Lengthening the idle period duration in order to enable these far half-duplex terminals would not be a satisfactory solution as it would result in a loss of active transmission duration for all other terminals handled by the base station.

The present invention aims at enabling a base station of a wireless cellular telecommunication network to determine as soon as possible, if it can not handle a half-duplex terminal.

To that end, the present invention concerns a method for determining, in a wireless cellular telecommunication network, if a base station can not handle a half-duplex terminal, the base station transferring signals in a cell of the base station, the half-duplex terminal, when being handled by the base station, not transferring and not receiving signals during a period of time, called idle period of the cell of the base station, characterized in that the method comprises the steps, executed by the base station, of:

transferring signals in the cell of the base station,
receiving a signal transferred by the half-duplex terminal in response to a signal transferred by the base station,
determining from the received signal, a characteristic of the half-duplex terminal in the cell,
determining that the base station can not handle the half-duplex terminal if the characteristic of the half-duplex terminal in the cell is not compatible with the idle period.

The present invention concerns also a base station of a wireless cellular telecommunication network able to determine if the base station can not handle a terminal, the base station transferring signals in a cell of the base station, the half-duplex terminal, when being handled by the base station, not transferring and not receiving signals during a period of time, called idle period of the cell of the base station, characterized in that the base station comprises:

means for transferring signals in the cell of the base station,
means for receiving a signal transferred by the half-duplex terminal in response to a signal transferred by the base station,
means for determining from the received signal, a characteristic of the half-duplex terminal in the cell,
means for determining that the base station can not handle the half-duplex terminal if the characteristic of the half-duplex terminal in the cell is not compatible with the idle period.

Thus, the base station, even if the mobile terminal is located in the cell of the base station, can decide not to handle a terminal.

By comparing the characteristic of the half-duplex terminal in the cell of the base station to the idle period, the base station can determine if the half-duplex terminal is able to operate with the idle period of the cell.

Furthermore, the idle period of the cell doesn't need to be determined in order to enable any half-duplex terminal located in the cell of the base station to be handled by the base station. The signaling overhead is then reduced.

According to a particular feature, the wireless telecommunication network uses half duplex Frequency Division Duplexing scheme and only half-duplex terminals handled by the base station do not transfer and do not receive signals during the idle period of the cell of the base station or the half-duplex terminals handled by the base station and the base station do not transfer and do not receive signals during the idle period.

Thus, the specific implementation costs at the base station due to half-duplex FDD terminals are reduced or the power consumption of the base station is limited.

According to a particular feature, the wireless telecommunication network uses Time Division Duplexing scheme and the half-duplex terminals handled by the base station and the base station do not transfer and do not receive signals during the idle period.

Thus, the interference between uplink and downlink communication is reduced.

According to a particular feature, the characteristic of the half-duplex terminal is the delay between the transfer of the signal by the base station and the reception of the signal transferred in response by the half-duplex terminal.

Thus, the characteristic of the half-duplex terminal in the cell is easily determined and reflects the distance between the half-duplex terminal and the base station. The half-duplex terminal doesn't need to get its location and to transfer it to the base station.

According to a particular feature, the determination of the compatibility of the characteristic of the half-duplex terminal with the idle period is executed by checking if the received signal is received within a time duration.

Thus, the determination of the compatibility is easy to realise.

According to a particular feature, the characteristic of the terminal in the cell is the distance separating the terminal and the base station.

Thus, if the half-duplex terminal is capable of determining its location, e.g. if it is equipped with Global Navigation Satellite System device or if it can deduce positioning information from the received signal itself or from any other means, it can transfer its location to the base station which can determine the distance separating the base station and the half-duplex terminal.

According to still another aspect, the present invention concerns a method for determining, in a wireless cellular telecommunication network, if a characteristic of half-duplex terminal is compatible with an idle period of a cell of a base station, the half-duplex terminal receiving signals transferred by the base station in the cell of the base station wherein the half-duplex terminal is located, the idle period of the cell being a period of time, in which when the half-duplex terminal is handled by the base station, the half-duplex terminal does not transfer and does not receive signals, characterized in that the method comprises the steps, executed by the half-duplex terminal, of:

receiving signals transferred by the base station,
transferring signal to the base station if the received signals are upper than a predetermined value,
determining that the characteristic of the half-duplex terminal in the cell is not compatible with the idle period if no signal representative of an acceptance of the base station to handle the half-duplex terminal is received within at least one period of time or if a signal representative of a deny of the base station to handle the half-duplex terminal is received.

According to still another aspect, the present invention concerns a device for determining, in a wireless cellular telecommunication network, if a characteristic of half-duplex terminal is compatible with an idle period of a cell of a base station, the half-duplex terminal receiving signals transferred by the base station in the cell of the base station wherein the half-duplex terminal is located, the idle period of the cell being a period of time, in which when the half-duplex terminal is handled by the base station, the half-duplex terminal does not transfer and does not receive signals, characterized in that the device is included in the half-duplex terminal and comprises:

means for receiving signals transferred by the base station,
means for transferring signal to the base station if the received signals are upper than a predetermined value,
means for determining that the characteristic of the half-duplex terminal in the cell is not compatible with the idle period if no signal representative of an acceptance of the base station to handle the half-duplex terminal is received within at least one period of time or if a signal representative of a deny of the base station to handle the half-duplex terminal is received.

Thus the half-duplex terminal is aware, even if the quality of the signal received from the base station is good, that the base station is not a good candidate for handling the terminal.

The half duplex terminal can then avoid, later on, a request to be handled by that base station. The processing resources of the half-duplex terminal as the resources of the wireless cellular telecommunication network are then preserved.

According to a particular feature, the wireless telecommunication network uses half duplex Frequency Division Duplexing scheme and only half-duplex terminals handled by the base station do not transfer and do not receive signals during the idle period of the cell of the base station or the half-duplex terminals handled by the base station and the base station do not transfer and do not receive signals during the idle period.

Thus, the specific implementation costs at the base station due to half-duplex FDD terminals are reduced or the power consumption of the base station is limited.

According to a particular feature, the wireless telecommunication network uses Time Division Duplexing scheme and the half-duplex terminals handled by the base station and the base station do not transfer and do not receive signals during the idle period.

Thus, the interference between uplink and downlink communication is reduced.

According to a particular feature, if the characteristic of the half-duplex terminal in the cell is not compatible with the idle period, the terminal:

transfers another signal to the base station,
determines that the characteristic of the terminal in the cell is not compatible with the idle period if no signal representative of an acceptance of the base station to handle the half-duplex terminal is received within another period of time or if a signal representative of a deny of the base station to handle the half-duplex terminal is received.

Thus, the half-duplex terminal is informed that it can not be handled by the base station.

Furthermore, as the determination is executed at least twice, the risk that a message is not received due to noise is minimized.

According to a particular feature, the characteristic of the half-duplex terminal is the delay between the transfer of the signal by the base station and the reception of the signal transferred in response by the half-duplex terminal.

Thus, the characteristic of the half-duplex terminal in the cell is easily determined and reflects the distance between the half-duplex terminal and the base station. The half-duplex terminal doesn't need to get its location and to transfer it to the base station.

According to a particular feature, the half-duplex terminal receives signals from plural base stations, the cells of the wireless cellular telecommunication network being synchronised, and the terminal:

ranks the base stations according to the instant of reception of their respective signal by the half-duplex terminal,
selects one of the base stations,
transfers signal to the selected base station,
determines that the characteristic of the terminal in the cell is not compatible with the idle period if no signal representative of an acceptance of the base station to handle the half-duplex terminal is received within at least one period of time or if a signal representative of a deny of the base station to handle the half-duplex terminal is received,
determines that the characteristic of the terminal is not compatible with the idle period of each other cell having a same or smaller duration than the duration of the idle period of the cell and a lower rank than the selected base station, if no signal representative of an acceptance of the selected base station to handle the half-duplex terminal is received within at least one period of time or if a signal representative of a deny of the selected base station to handle the half-duplex terminal is received.

Thus, the number of transfers of signals to different base stations is limited. The base stations are ranked according to their distance from the half-duplex terminal, from the lowest distance to the largest distance, the lowest rank corresponding to the largest distance. If the characteristic of the terminal in the cell is not compatible with the idle period of a cell, the characteristic of the terminal will not be compatible with the idle period of the cells of the base stations having same or smaller idle period and lower rank.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

The characteristics of the invention will emerge more clearly from a reading of the following description of an example embodiment, the said description being produced with reference to the accompanying drawings, among which:

The wireless telecommunication system may be a wireless telecommunication system which uses Time Division Duplexing scheme (TDD) or half duplex Frequency Division Duplexing scheme.

In TDD scheme, the signals transferred in uplink and downlink channels are duplexed in different sub frames, named also time slots, in the same frequency band.

In full duplex Frequency Division Duplexing scheme, the signals transferred in uplink and downlink channels are duplexed in same sub frames, named also time slots, in different frequency bands.

In half duplex FDD scheme, from the half-duplex terminal side, the signals transferred in uplink and downlink channels are duplexed in different sub frames, named also time slots, in different frequency bands. It should be noted that in such case, a base station may be able to use a full duplex Frequency Division Duplexing scheme whilst communicating with several half-duplex FDD terminals at the same time by appropriately ordering the time slots of each half-duplex FDD terminal.

When a base station BS transfers symbols to a terminal TEi, with i=1 to 2, the data, the signals or the messages are transferred through a downlink channel.

When a terminal TEi, with i=1 to 2, transfers symbols to the base station BS, the signals or data are transferred through an uplink channel.

Figure 1:
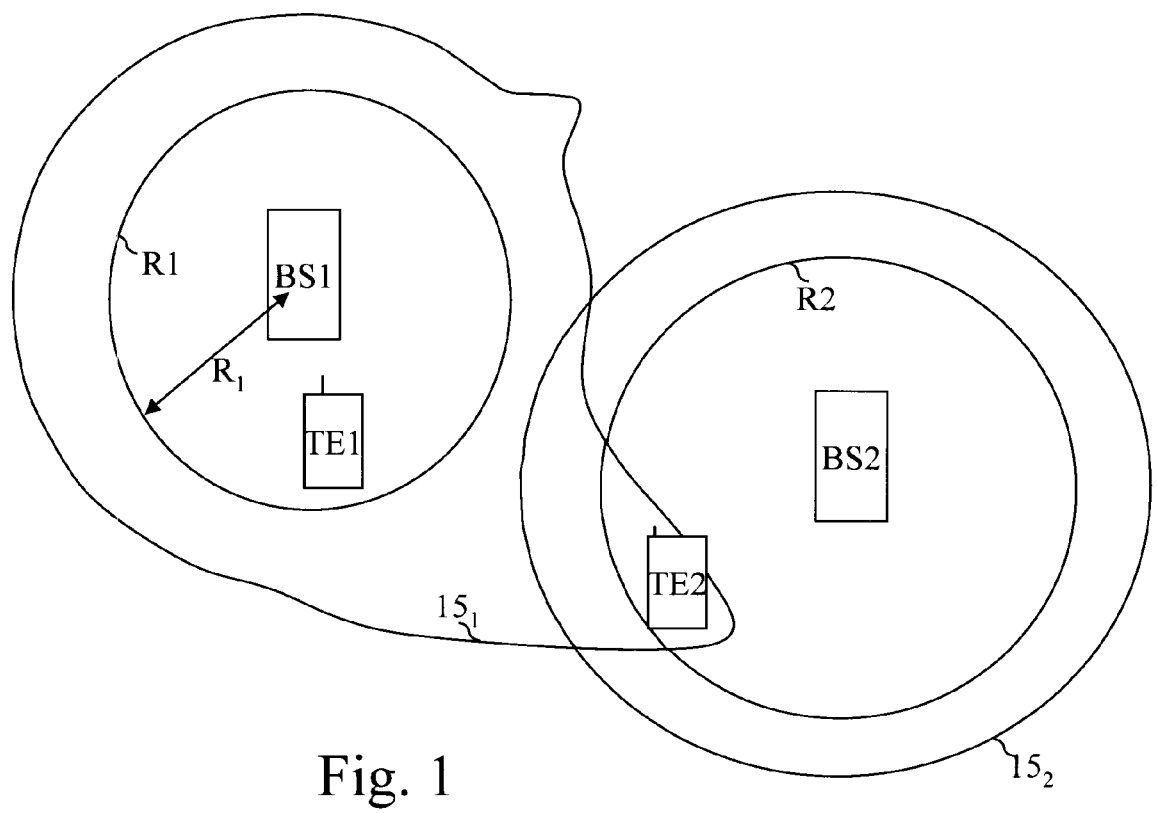
FIG. 1 is a diagram representing the architecture of the wireless telecommunication system in which the present invention is implemented.

In the telecommunication system of the FIG. 1, at least one and preferably plural terminals TE1 and TE2 are comprised in a cell $15_1$ of a base station BS1 and the terminal TE2 is further comprised in the cell $15_2$ of the base station BS2.

Only two base stations BS are shown in the FIG. 1 for the sake of simplicity but in practice, and especially when the wireless network is a wireless cellular network, the wireless cellular telecommunication system is composed of plural base stations BS.

The cell $15_1$ of the base station BS1 is the area in which the power strength of the signals transferred by the base station BS1, like the one transferred in the measurement channel of the base station BS1, are received by a terminal TE located in the cell $15_1$ at a level which is upper than a predetermined value.

When a full-duplex terminal TE is located in the cell $15_1$ of the base station BS1, the base station BS1 can handle the full-duplex terminal TE. The full-duplex terminal TE can establish or receive a communication with a remote telecommunication device through the base station BS1. The cell $15_1$ has not a regular shape. This is mainly due to the particular locations which are in line of sight with the base station BS1 or obstructions.

The area R1 of the base station BS1 is the area in which, for each terminal TE located in R1, the sum of the round trip delay between the base station BS1 and the terminal TE and the switch between receive and transmit modes and/or the switch between transmit and receive modes is lower than or equal to the idle period of the cell $15_1$.

In other words, when a half-duplex or full-duplex terminal TE is located in the area R1 of the base station BS1, the terminal TE can be handled by the base station BS1 and can establish or receive a communication with a remote telecommunication device through the base station BS1.

When a half-duplex terminal TE is located in the cell $15_1$ and is not located in area R1 of the base station BS1, the half-duplex terminal TE can not be handled by the base station BS1 as the terminal TE has a characteristic in the cell $15_1$ which is not compatible with the idle period of the cell $15_1$.

The area R1 is included in the cell $15_1$. The difference between R1 and $15_1$ is defined by the idle period set for the cell $15_1$.

A large idle period will enable any half-duplex terminal TE to be handled by the base station BS1 but will reduce the overall capacity in term of data transferred between the base station BS1 and the half-duplex terminals TE. R1 is defined so as to provide to a majority of half duplex terminals TE located in the cell $15_1$, the possibility to be handled by the base station BS1. R1 is defined so as to avoid that the idle period has to be lengthened only for a minority of half-duplex terminals TE which are far from the base station BS1.

The cell $15_2$ of the base station BS2 is the area in which the power strength of the signals, like the one transferred in the measurement channel of the base station 13S2, is received by a terminal TE located in the cell $15_2$ at a level which is upper than a predetermined value. When a full-duplex terminal TE is located in the cell $15_2$ of the base station BS2, the base station BS2 can handle the full-duplex terminal TE. The full-duplex terminal TE can establish or receive a communication with a remote telecommunication device through the base station BS2.

The area R2 of the base station BS2 is the area in which, for each terminal TE located in R2, the sum of the round trip delay between the base station BS2 and the terminal TE and the switch between receive and transmit modes and/or the switch between transmit and receive modes is lower than or equal to the idle period of the cell $15_2$.

In other words, when a half-duplex or full-duplex terminal TE is located in the area R2 of the base station BS2, the terminal TE can be handled by the base station BS2 and can establish or receive a communication with a remote telecommunication device through the base station BS2.

When a half-duplex terminal TE is located in the cell $15_2$ and is not located in area R2 of the base station BS2, the half-duplex terminal TE can not be handled by the base station BS2 as the terminal TE has a characteristic in the cell $15_2$ which is not compatible with the idle period of the cell $15_2$.

The area R2 is comprised in the cell $15_2$. The difference between R2 and $15_2$ is defined by the idle period set for the cell $15_2$.

It has to be noted here that the idle period set respectively for the cells $15_1$ and $15_2$ may be equal or different.

In the FIG. 1, the terminal TE1 is located in the cell $15_1$ and the area R1 of the base station BS1. The terminal TE2 is located in the cell $15_1$ of the base station BS1 and in the cell $15_2$ and the area R2 of the base station BS2.

According to the invention, each base station BS transfers a signal in its cell 15, determines if the terminal TE is a half duplex terminal TE, and if the terminal TE is a half duplex terminal TE:

receives a signal transferred by the terminal TE in response to a signal transferred by the base station BS,
  determines from the received signal, a characteristic of the terminal TE in the cell 15,
  determines that the base station BS can not handle the terminal TE if the characteristic of the terminal TE in the cell 15 is not compatible with the idle period of the cell 15.

According to a particular feature, the characteristic of the terminal TE is the delay between the transfer of the signal by the base station BS and the reception of the signal transferred in response by the terminal TE.

According to a particular feature, the determination of the compatibility of the characteristic of the terminal TE with the idle period is executed by checking if the received signal is received within a time period.

According to a particular feature, the characteristic of the terminal TE in the cell 15 is the distance separating the terminal TE and the base station BS which is transferred by the terminal TE or which is determined from the position of the terminal TE included in the received signal, or which is determined from the received signal itself.

Only two terminals TE are shown in the FIG. 1 for the sake of simplicity but in practice, a more important number of terminals TE which are full-duplex or half-duplex, are in the cells 15 of the base stations BS. The base stations BS are able to determine if each terminal TE is a full-duplex or a half-duplex terminal TE.

The base stations BS are also named nodes or nodes B or enhanced nodes B or access points.

The terminals TE1 and TE2 are half-duplex terminals like mobile phones, personal digital assistants, or personal computers. The terminals TE are also named user equipments.

The wireless telecommunication network may be cell-synchronised. In this case, the signals originated from different cells 15 or base stations BS are simultaneously transmitted.

More precisely, the signals are structured in frames, which are themselves composed of symbols. Cell synchronisation may be ensured at the symbol level meaning that the transmission time of a symbol at a given cell 15 or base station BS matches the transmission time of a symbol at any other cell 15 or base station BS. Cell synchronisation may also be ensured at the frame level. In that case, the transmission time of a frame at a given cell 15 or base station BS matches the transmission time of a frame at any other cell 15 or base station BS. Cell synchronisation can be carried out by including a GNSS (Global Navigation Satellite System) in each base station BS.

As an alternative, the wireless telecommunication network may be cell-desynchronised. In this case, no synchronisation at the frame level nor at the symbol level needs to be ensured between different cells 15 or base stations BS.

Figure 2A:
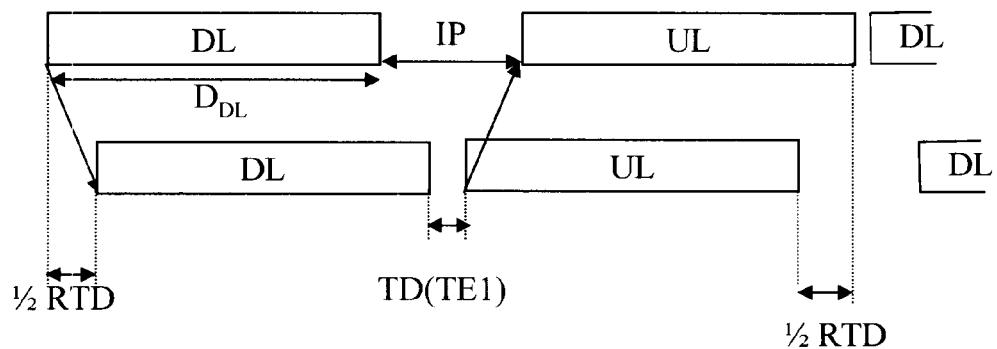
FIG. 2a is a chronogram depicting the idle period when the uplink channel is synchronous and where both the base station and the half-duplex terminal don't transfer and receive signals in the idle period of the cell.

FIG. 2a is a chronogram depicting the idle period when the uplink channel is synchronous and where both the base station and the half-duplex terminal don't transfer and receive signals in the idle period of the cell.

When the uplink channel is synchronous, the symbols transmitted in the uplink channel of a given cell 15 of a base station BS have to be received at the same time tr by the base station BS, regardless of the distance separating the base station BS and the terminal TE. When no signal is received or transferred during the idle period by both the base station and the half-duplex terminal side, the base station BS has to wait for the reception of the symbols transmitted by the terminal TE in order to perform the processing thereof.

The waiting time determined for the terminal TE which is located at the border of the area R1 or R2 or in other words, the largest waiting time that can be determined, is called the Guard Period or idle period IP and must be equal at least to the round trip delay RTD(Ra) plus the Receive Transmit Switch times RTS, where Ra is the radius of the area R1 or R2 if the area R1 or R2 is considered as a circle.

The base station BS1 transfers downlink symbols DL to the terminal TE1. These downlink symbols DL are received by the terminal TE1 at a delay equal to half of the round trip delay RTD.

During the idle period IP, the base station BS doesn't transfer or receive any symbol. By not transferring or receiving any symbol, power consumption of the base station is reduced.

As the uplink symbols need to be received by the base station BS at the same time regardless of the distance separating the base station BS and each terminal TE comprised in its cell 15, the base station BS determines a timing delay TD(d) for each of the terminals TE.

The timing delay is calculated using the following formula:
$TD(d)=tr-te-D_{DL}-RTD(d)=IP-RTD(d)$, where d is the distance between the terminal TE and the base station BS and $D_{DL}$ being the total duration of the symbols the terminal TE can receive in the downlink channel.

From each timing delay, the base station BS determines the Timing Advance $TA=IP-TD(d)$ for each terminal TE and transfers the Timing Advance to the corresponding terminal TE.

In case the terminal TE1 is scheduled in the uplink timeslot just following a preceding downlink timeslot comprising data for the terminal TE, the terminal TE1 applies its Timing Advance TA(TE1) value for the transmission of symbols over the uplink channel in such a manner that the transmitted symbols are received at the base station BS from the terminal TE 1 at the beginning of the uplink timeslot tr.

It has to be noted here that the idle period IP is discontinuous. It is composed for the terminal TE(1) of the two time periods noted ½ RTD and the time period TD(TE1).

Figure 2B:
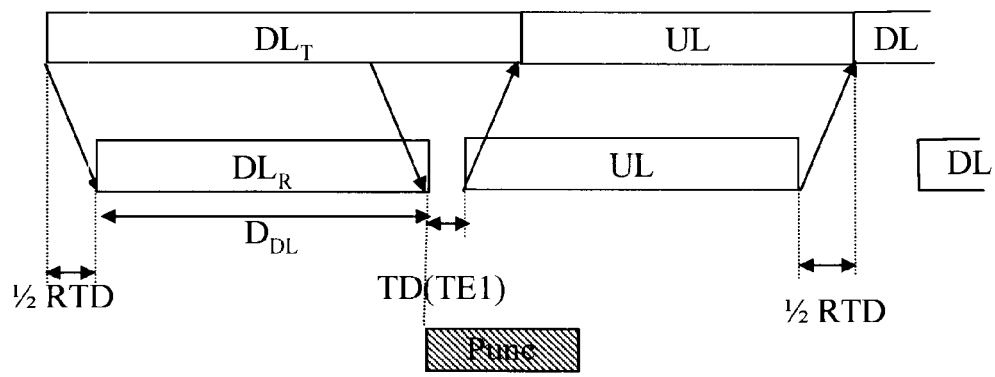
FIG. 2b is a chronogram depicting the idle period when the uplink channel is synchronous and where the half-duplex terminal does not transfer and receive signals in the idle period of the cell.

FIG. 2b is a chronogram depicting the idle period when the uplink channel is synchronous and where the half-duplex terminal does not transfer and receive signals in the idle period of the cell.

During the idle period in the example of the FIG. 2b, only the terminal TE does not receive or transfer signals.

The base station BS transfers symbols in the downlink channel $DL_T$ without any consideration of an idle period. The base station BS considers each terminal TE as being potentially a full-duplex terminal TE. The base station BS may transfer symbols even if they are not usable by the half-duplex terminals. Transferring non-usable symbols reduces development costs for manufacturing specific features of base stations BS which are able to handle full and half-duplex terminals TE.

When a half-duplex terminal TE, as example the terminal TE1 receives the symbols in the downlink channel $DL_T$, the terminal TE1 executes some puncturing on the received symbols. The terminal TE1 receives only the downlink symbols in $DL_R$ which are compatible with the idle period of the cell 15, i.e. the downlink symbols which are comprised in the duration $D_{DL}$ of the symbols the terminal TE can receive in the downlink channel.

The timing advance TA(TE1) and the timing delay TD(TE1) for the terminal TE1 are determined in a similar way as it has been disclosed in the FIG. 2a.

It has to be noted here that the idle period IP is continuous at the base station BS whereas it is discontinuous at the half-duplex terminal TE1. It is composed for the terminal TE1 of the two time periods noted ½ RTD and the time period TD(TE1).

Those signals Punc which are not comprised in $D_{DL}$ are not processed.

Figure 3:
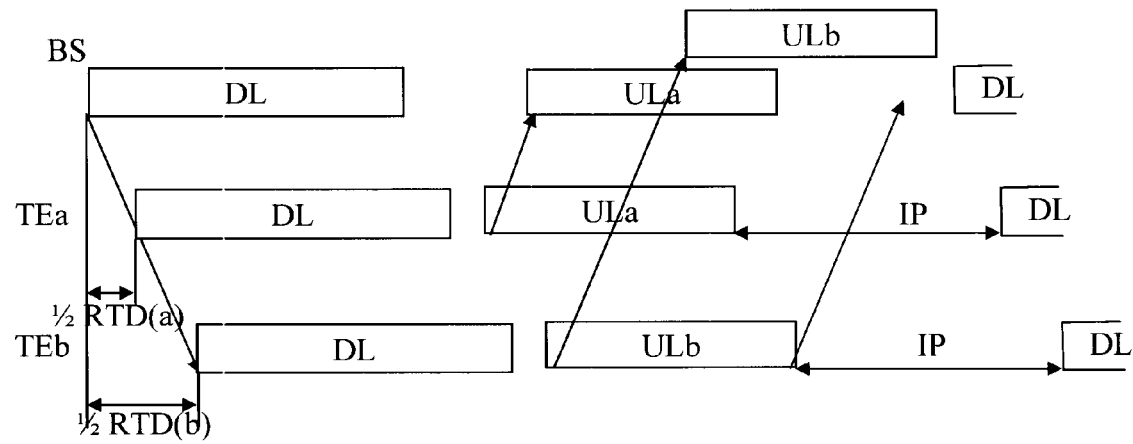
FIG. 3 is a chronogram depicting the idle period when the uplink channel is asynchronous, the wireless telecommunication network uses Time Division Duplexing scheme and both the half-duplex terminal located in the cell and the base station do not transfer and do not receive signals during the idle period.

FIG. 3 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

When the uplink channel is asynchronous, i.e. when the symbols transmitted in the uplink channel from different terminals TE do not have to be received at the same time, each terminal TEa or TEb transmits uplink symbols ULa or ULb over the uplink channel after a same predefined duration after the end of the reception of the signals transmitted by the base station BS in the downlink channel. The idle period is thus created at the base station BS to absorb the different propagation distance of the different terminals in the cell 15.

The terminal TEa is closer to the base station BS than the terminal TEb. The terminal TEa receives downlink symbols DL after half a round trip delay RTD(a) which is lower than half the round trip delay RTD(b) of the terminal TEb.

If the terminal TEa transfers symbols, these symbols are received by the base station BS earlier than the one transferred by the terminal TEb as it is shown in the FIG. 3.

Figure 4:
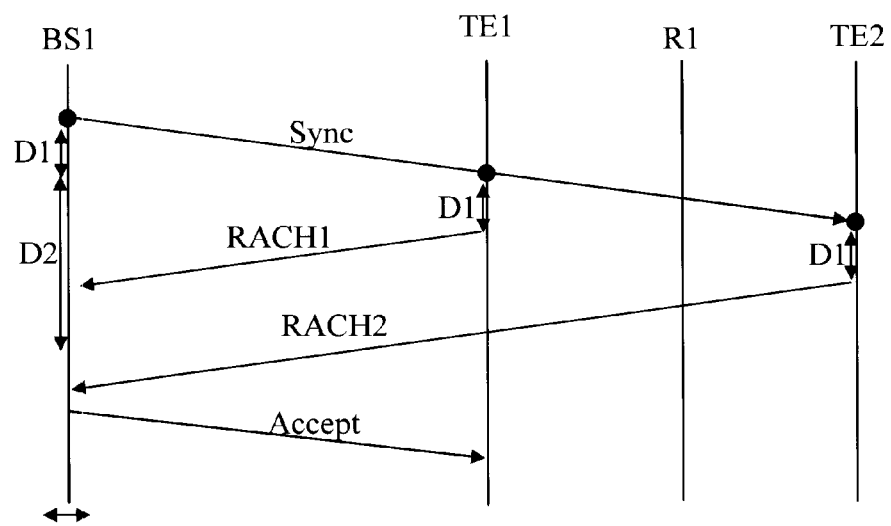
FIG. 4 depicts an example of a chronogram of signals transferred according to the present invention.

FIG. 4 depicts an example of a chronogram of signals transferred according to the present invention.

In the example of the FIG. 4, the characteristic of the terminal TE is the delay between the transfer of the signal by the base station BS and the reception of the signal transferred in response by the terminal TE.

In that example, the determination of the compatibility of the characteristic of the terminal TE with the idle period is executed by checking if the received signal is received within a time period.

The FIG. 4 shows the signals transferred by the base station BS1 and the messages transferred by the terminals TE1 and TE2 in response to the signals transferred by the base station BS1.

The base station BS1 transfers periodically or after some particular events, signals Sync in a measurement channel.

Preferably, the base station BS1 waits for a time period noted D1 after the transfer of the signals Sync. D1 is known by each terminal TE and the base station BS1.

As the terminals TE1 and TE2 are located in the cell $15_1$ of the base station BS1, the power strength of the signals received from the base station BS1 by the terminals TE1 and TE2 is upper than a predetermined value.

In response, preferably after the time period D1, the terminal TE1 commands the transfer of a message representative of a request RACH1 to be handled by the base station BS1. The terminal TE2 commands also the transfer of a request RACH2 to be handled by the base station BS1. RACH1 and RACH2 messages preferably refer to a random access procedure.

The time period D1 is at least equal to the switch time from receive to transmit modes and/or equal to the switch time from transmit to receive modes.

It has to be noted here that, the switch times may be different from each other and/or may vary according to the terminal TE.

When the time period D1 elapses, the base station BS1 activates a second time period noted D2. D2 is at least equal to $2R_1/c$. c is the speed of light, $R_1$ is the maximum distance between the base station BS1 and a terminal TE located at the frontier of R1.

The base station BS1 accepts or rejects the requests of the terminal TE1 or TE2 according to the reception, or not, of the request RACH1 or RACH2 within the time period D2.

As the terminal TE1 is located in the area R1, the request RACH1 of the terminal TE1 is received during the time period D2, the base station BS1 commands the transfer of a message noted Accept representative of an acceptance to handle the terminal TE1.

As the terminal TE2 is not located in the area R1, the request RACH2 of the terminal TE2 is not received during the time period D2, the base station BS1 rejects to handle the terminal TE2.

The base station BS1 commands the transfer of a reject message or doesn't transfer any message to the terminal TE2.

It has to be noted here that instead of Sync signal and RACH signals, downlink and uplink signals can be used instead as example when the terminal TE is under communication with a remote communication device through the base station BS1. In that case, when the base station BS1 rejects to handle the terminal TE, the base station BS1 starts a handover procedure.

Figure 5:
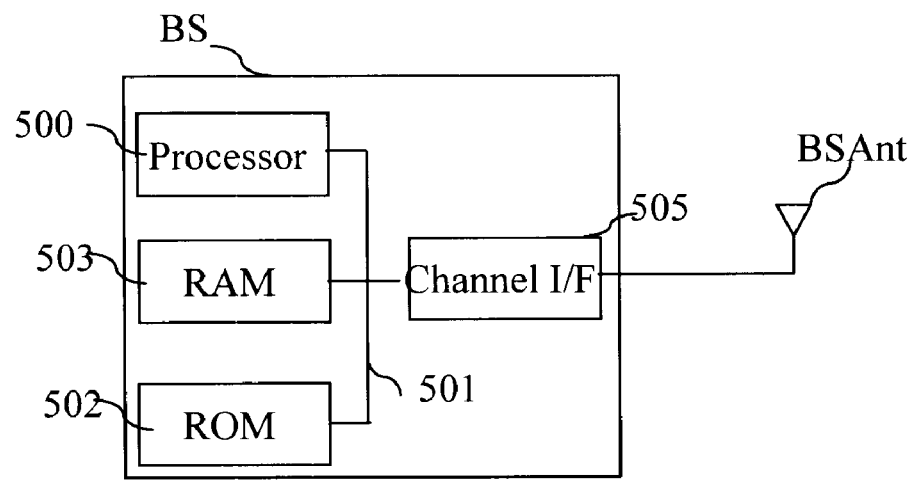
FIG. 5 is a diagram representing the architecture of a base station of the wireless telecommunication system according to the present invention.

FIG. 5 is a diagram representing the architecture of a base station according to the present invention.

Figure 7:
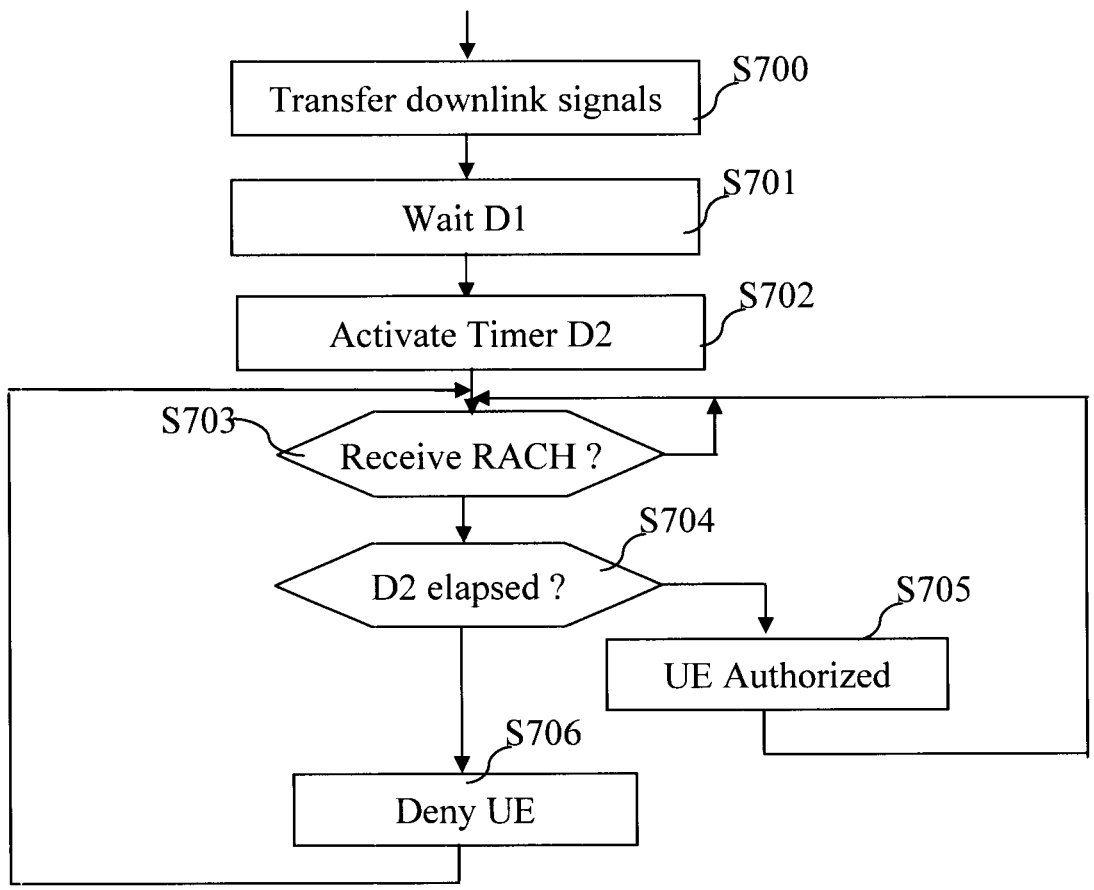
FIG. 7 is an example of algorithm executed by a base station according to the present invention.

The base stations BS, as example the base station BS1, have for example an architecture based on components connected together by a bus 501 and a processor 500 controlled by the program related to the algorithm as disclosed in the FIG. 7.

It has to be noted here that the base station BS1 is, in a variant, implemented under the form of one or several dedicated integrated circuits which execute the same operations as the one executed by the processor 500 as disclosed hereinafter.

The bus 501 links the processor 500 to a read only memory ROM 502, a random access memory RAM 503 and a channel interface 505.

The read only memory ROM 502 contains instructions of the program related to the algorithm as disclosed in the FIG. 7 which are transferred, when the base station 13S is powered on to the random access memory RAM 503.

The RAM memory 503 contains registers intended to receive variables, and the instructions of the program related to the algorithm as disclosed in the FIG. 7.

The channel interface 505 comprises means for transferring and/or receiving signals and/or messages to/from terminals TE through the antenna BSAnt.

Figure 6:
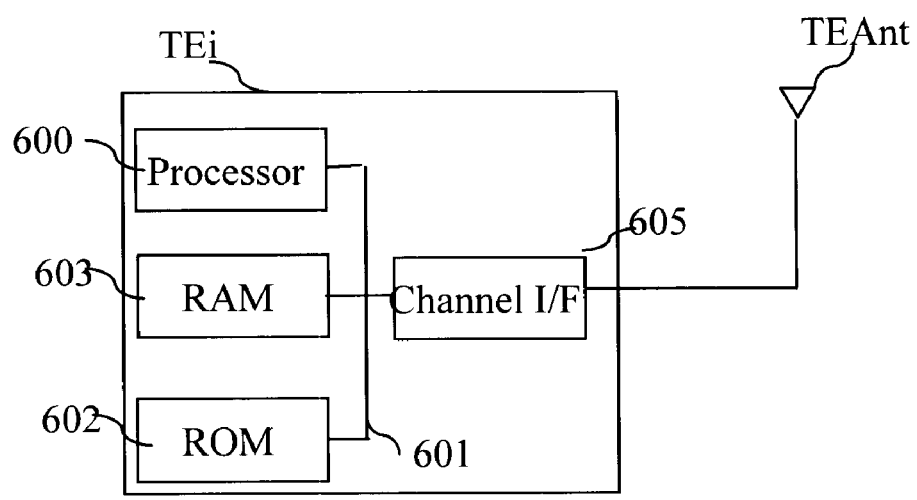
FIG. 6 is a diagram representing the architecture of a terminal of the wireless telecommunication system according to the present invention.

FIG. 6 is a diagram representing the architecture of a terminal according to the present invention.

Each terminal TEi, as example the terminal TE1, has, for example, an architecture based on components connected together by a bus 601 and a processor 600 controlled by programs related to the algorithms as disclosed in the FIG. 8.

It has to be noted here that the terminal TE1 is, in a variant, implemented under the form of one or several dedicated integrated circuits which execute the same operations as the one executed by the processor 600 as disclosed hereinafter.

The bus 601 links the processor 600 to a read only memory ROM 602, a random access memory RAM 603 and a channel interface 605.

The read only memory ROM 602 contains instructions of the programs related to the algorithms as disclosed in the FIG. 8 which are transferred, when the terminal TE1 is powered on to the random access memory RAM 603.

The RAM memory 603 contains registers intended to receive variables, and the instructions of the programs related to the algorithms as disclosed in the FIG. 8.

The channel interface 605 comprises means for transferring and/or receiving signals and/or messages to/from base stations BS through the antenna TEAnt and means for measuring the signals received, as example the signals Sync of the measurement channels.

FIG. 7 is an example of algorithm executed by a base station according to the present invention.

In the example of the FIG. 7, the characteristic of the terminal TE is the delay between the transfer of the signal by the base station BS and the reception of the signal transferred in response by the terminal TE.

In that example, the determination of the compatibility of the characteristic of the terminal TE with the idle period is executed by checking if the received signal is received within a time period.

More precisely, the present algorithm is executed by the processor 500 of each base station BS periodically or on particular events or each time downlink signals are transferred.

At step S700, the processor 500 commands the transfer of downlink signals through the channel interface 505. The downlink signals are Sync signals transferred in the measurement channel or are classical signals related to a communication in which the destination terminal TE is involved.

At next step S701, the processor 500 waits for the time period D1 as disclosed in the FIG. 4.

At next step S702, the processor 500 activates the second time period D2 as disclosed in the FIG. 4.

At next step S703, the processor 500 checks if an uplink signal transferred by the terminal TE in response to a signal transferred at step S700 is received by the channel interface 505. The uplink signal is a RACH signal or is a classical signal related to a communication in which the destination terminal TE is involved.

If a signal transferred by the terminal TE in response to a signal transferred at step S700 is received by the channel interface 505, the processor 500 moves to step 704. Otherwise, the processor 300 returns to step S703.

At step S704, the processor 500 checks if the time period D2 is elapsed.

If the time period D2 is elapsed, the processor 500 moves to step S706. Otherwise, the processor 500 moves to step S705.

By checking once the signal is received, if D2 expires, the processor 500 determines from the received signal, a characteristic of the terminal TE in the cell 15, i.e. if the round trip delay for the terminal TE is not upper than the idle period of the cell 15.

At step S706, the processor 500 determines that the base station BS can not handle the terminal TE as the characteristic of the terminal TE in the cell 15 is not compatible with the idle period of the cell 15. After that, the processor 500 returns to step 703 in case another terminal TE sends uplink signals.

At step S705, the processor 500 determines that the base station BS may handle the terminal TE as the characteristic of the terminal TE in the cell 15 is compatible with the idle period. The processor 500 notifies the terminal TE that the base station 13S handles the terminal TE or continues to handle the terminal TE and returns to step 703 in case another terminal TE sends uplink signals.

As the terminal TE1 is located in the area R1, the signal transferred by the terminal TE1 is received during the time period D2, the processor 500 commands the transfer of a message representative of an acceptance to handle the terminal TE1 or continue to handle the terminal TE.

As the terminal TE2 is not located in the area R1, the request RACH2 of the terminal TE2 is not received during the time period D2, the base station BS1 rejects to handle the terminal TE2. The terminal TE2 is notified of that rejection by receiving a rejection message from the base station BS or by receiving a request to proceed to a handover from the base station BS to another base station BS or by not receiving a message representative of an acceptance to handle the terminal TE2 within a predetermined time period.

Figure 8A:
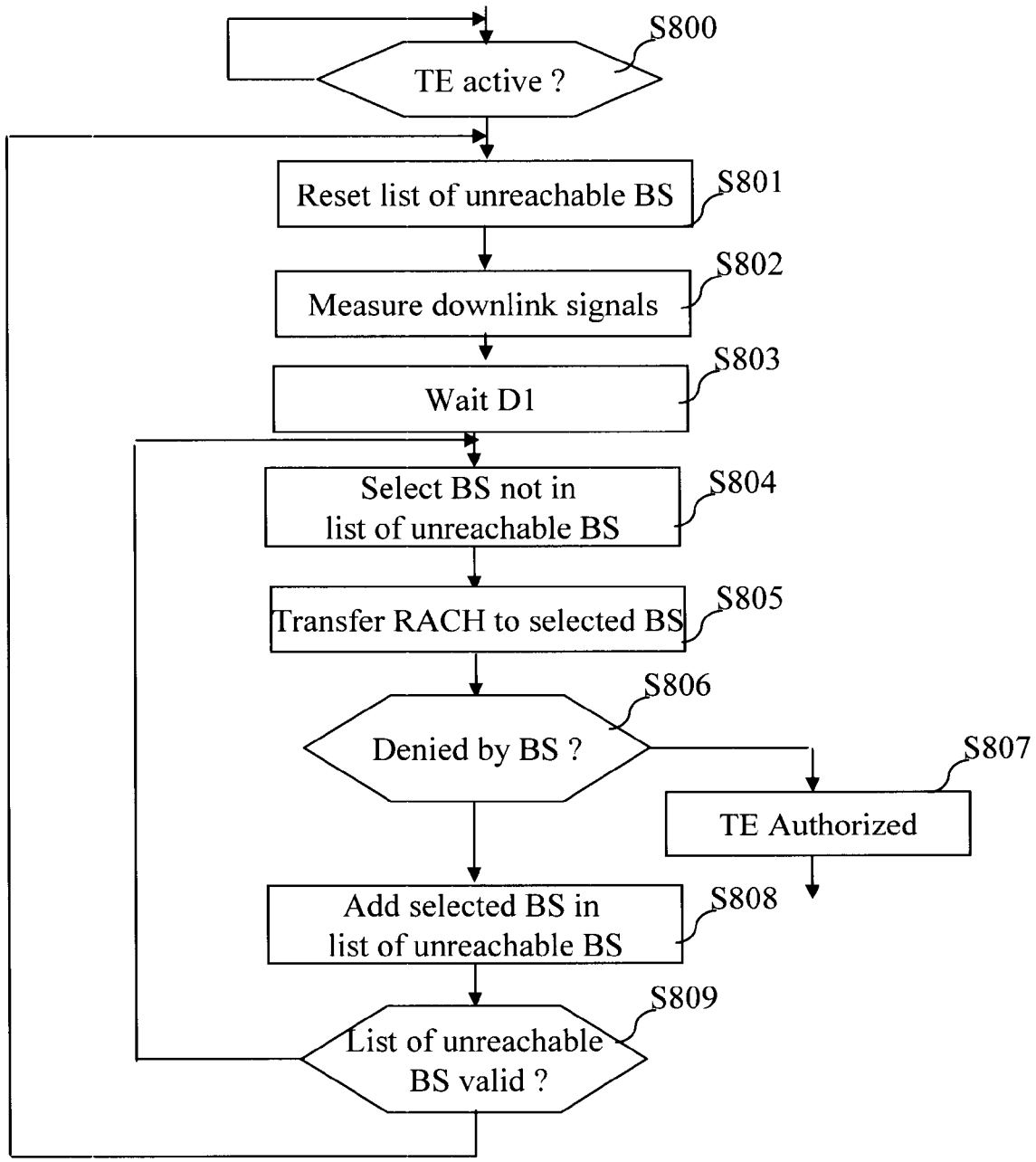
FIG. 8a is an example of an algorithm executed by a terminal according to a first mode of realisation of the present invention.

FIG. 8a is an example of an algorithm executed by a terminal according to the first mode of realisation of the present invention.

The present algorithm is more precisely executed by the processor 600 of each terminal TE when the wireless cellular telecommunication network is cell-synchronised or desynchronised.

At step S800, the processor 600 checks if the terminal TE is active. The terminal TE is active when it is powered on and in idle mode or when it is under communication with a remote telecommunication device.

If the terminal TE is not active, the processor 600 returns to step S800. Otherwise, the processor 600 moves to step S801.

A step S801, the processor 600 resets a list of unreachable base stations BS. The list of unreachable base stations BS intends to comprise the identifiers of the base stations BS which denied to handle the terminal TE. A list of unreachable base stations BS is reset by emptying its content.

At next step S802, the processor 600 commands the channel interface 605 to execute some quality measurements on downlink signals. The channel interface 605 measures the signals transferred, e.g. in each measurement channel, by the base stations BS it can find and memorises the base stations BS and the measurements for which the quality measurements are higher than a predetermined value.

At next step S803, the processor 600 waits for the time period D1 as disclosed in the FIG. 4.

At next step S804, the processor 600 selects one of the base stations BS for which a quality measurement is higher than a predetermined value and which does not belong to the list of unreachable base stations BS.

At next step S805, the processor 600 commands the transfer of a signal to the selected base station BS. The signal is as example a RACH message which may comprise a report of the quality measurements made at step S802.

At step S806, the processor 600 checks if the selected base station BS denied to handle the terminal TE. The terminal TE is notified of that deny by receiving a rejection message from the base station BS or by not receiving a message representative of an acceptance to handle the terminal TE within a predetermined time period.

If the selected base station BS denied to handle the terminal TE, the processor 600 moves to step S808. Otherwise, the base station BS moves to step S807.

At step S807, the processor 600 registers that the selected base station BS handles the terminal TE and interrupts the present algorithm.

At step S808, the processor 600 identifies the selected base station BS as a base station BS which can not handle the terminal TE and memorizes the identifier of the base station BS in the list of unreachable base stations BS.

At next step S809, the processor 600 checks if the list of unreachable base stations BS has been reset for a predetermined time duration, i.e. checks if the list of unreachable base stations BS can still be considered as valid.

If the list of unreachable base stations BS can still be considered as valid, the processor 600 returns to step S804.

If the list of unreachable base stations BS can not be considered as valid anymore, the processor 600 returns to step S801.

The validity of the list may change according to the terminal TE mobility, the terminal TE location information, the environment of the terminal TE, etc.

It should be noted that instead of resetting the whole list of unreachable base stations BS once the validity of the list has expired, the list of unreachable base stations BS may be reset on base station BS case if the presence of a specific base station BS in the list of unreachable base stations BS is no longer justified.

Figure 8B:
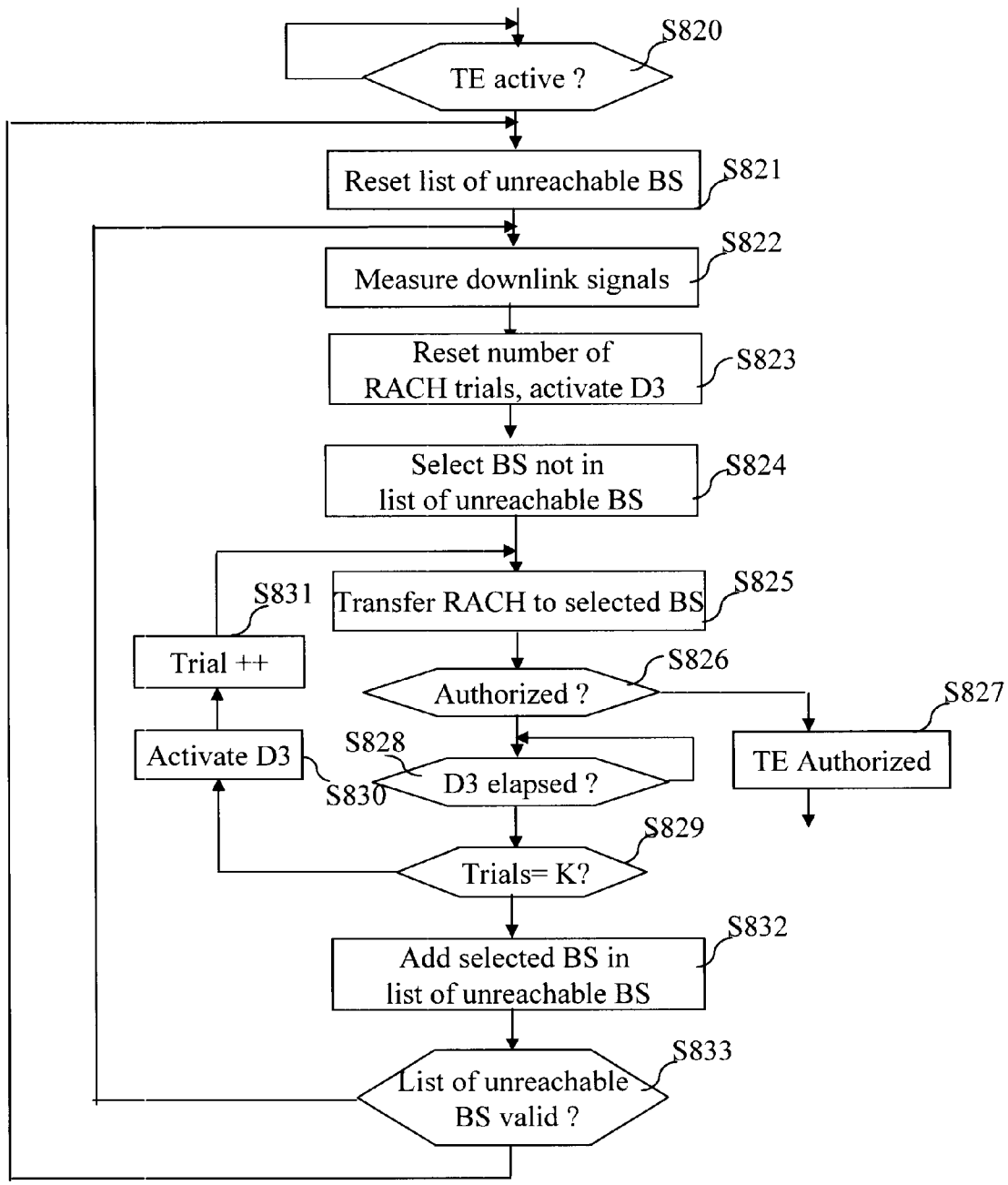
FIG. 8b is an example of an algorithm executed by a terminal according to a second mode of realisation of the present invention.

FIG. 8b is an example of an algorithm executed by a terminal according to the second mode of realisation of the present invention.

The present algorithm is more precisely executed by the processor 600 of each terminal TE when the wireless cellular telecommunication network is cell-synchronised or de-synchronised.

At step S820, the processor 600 checks if the terminal TE is active. The terminal TE is active when it is powered on and in idle mode or when it is under communication with a remote telecommunication device.

If the terminal TE is not active, the processor 600 returns to step S820. Otherwise, the processor 600 moves to step S821.

At step S821, the processor 600 resets a list of unreachable base stations BS. The list of unreachable base stations BS intends to comprise the identifiers of the base stations BS which denied to handle the terminal TE. A reset of the list of unreachable base stations BS makes the list empty.

At next step S822, the processor 600 commands the channel interface 605 to execute some quality measurements on downlink signals. The channel interface 605 measures the signals transferred, e.g. in each measurement channel, by the base stations BS it can find and memorises the base stations BS for which the quality measurements are upper than a predetermined value.

At next step S823, the processor 600 resets the number of transmission of signals in response to the downlink signals received at step S822 and activates a timer D3 which has predetermined value or which is randomly selected between two values.

At next step S824, the processor 600 selects one of the base stations BS for which the quality measurement is higher than a predetermined value and which does not belong to the list of unreachable base stations BS.

At next step S825, the processor 600 commands the transfer of a signal to the selected base station BS. The signal is as example a RACH message which may comprise a report of the measurements made at step S822.

At step S826, the processor 600 checks if the selected base station BS denied to handle the terminal TE. The terminal TE is notified of that deny by not receiving a message representative of an acceptance to handle the terminal TE within a predetermined time period or by receiving a request to proceed to a handover from the base station BS to another base station BS.

If the selected base station BS denied to handle the terminal TE, the processor 600 moves to step S828. Otherwise, the base station BS moves to step S827.

At step S827, the processor 600 registers that the selected base station BS handles the terminal TE and interrupts the present algorithm.

At step S828, the processor 600 checks if the time duration D3 is elapsed. As far as the time duration D3 is not elapsed, the processor 600 stays at step S828. If the time duration D3 is elapsed, the processor 600 moves to step S829.

At step S829, the processor 600 checks if the number of trials is equal to a predetermined value noted K.

If the number of trials is not equal to a predetermined value noted K, the processor 600 moves to step S830 and activates the time duration D3.

At next step S831, the processor 600 increments the number of trials and returns to step S825.

If the number of trials is equal to the predetermined value noted K, the processor 600 moves to step S832.

At step S832, the processor 600 identifies the selected base station BS as a base station BS which can not handle the terminal TE and memorizes the identifier of the base station BS in the list of unreachable base stations BS.

At next step S833, the processor 600 checks if the list of unreachable base stations BS has been reset for a predetermined time duration, i.e. checks if the list of unreachable base stations BS can still be considered as valid.

If the list of unreachable base stations BS can still be considered as valid, the processor 600 returns to step S822.

If the list of unreachable base stations BS can not be considered as valid, the processor 600 returns to step S821.

Figure 8C:
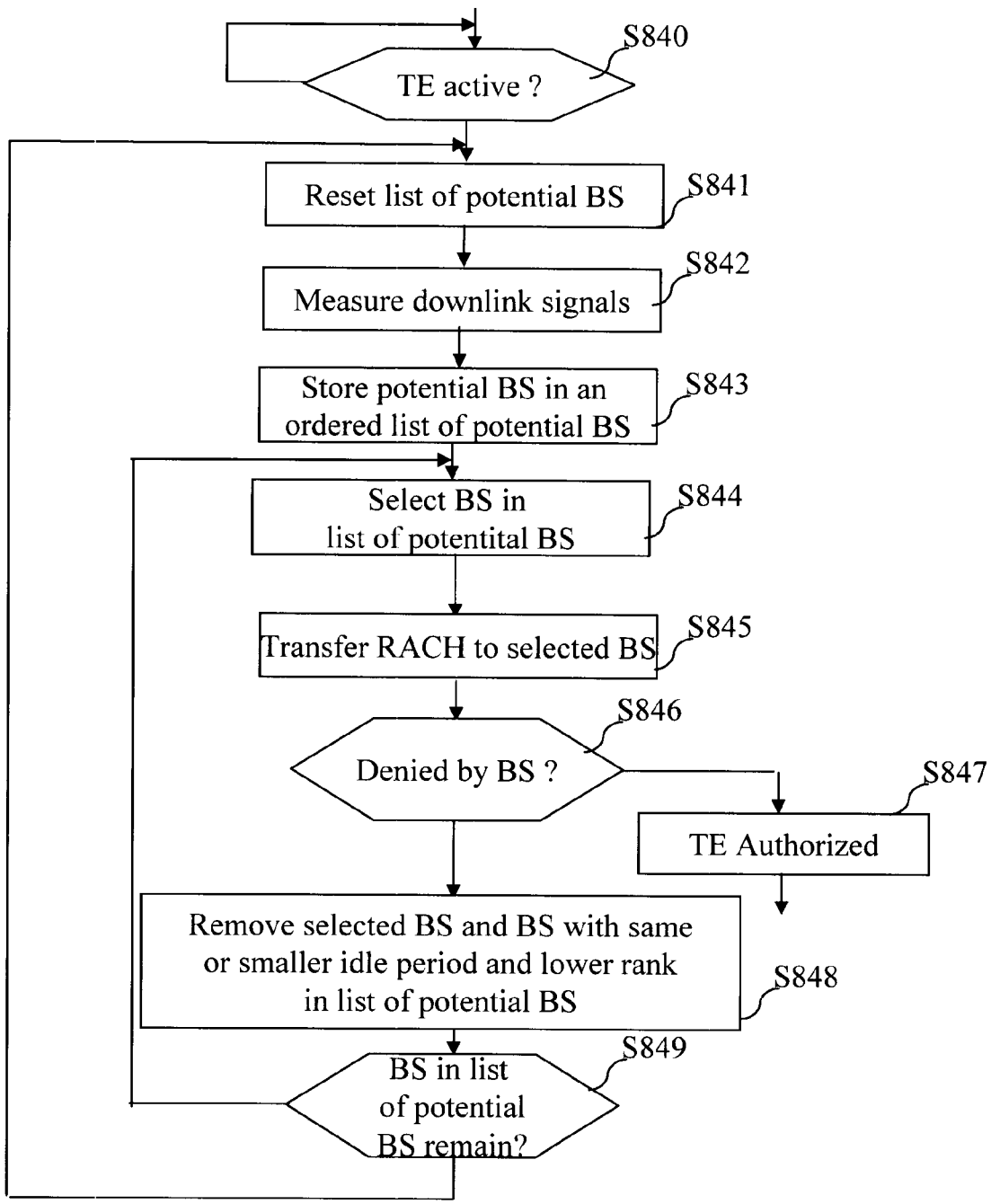
FIG. 8c is an example of an algorithm executed by a terminal according to a third mode of realisation of the present invention.

FIG. 8c is an example of an algorithm executed by a terminal according to the third mode of realisation of the present invention.

The present algorithm is more precisely executed by the processor 600 of each terminal TE when the wireless cellular telecommunication network is cell-synchronised.

In cell-synchronised networks, the order of arrival of the downlink messages transferred by base stations BS can be used for ranking the base stations BS according to their distance from the terminal TE.

The first signal received by a terminal TE from a base station BS denotes that the base station BS and the terminal TE are close.

The last signal received by a terminal TE from a base station BS denotes that the base station BS is far from the terminal TE.

The third mode of realisation takes advantageously profit of that characteristic.

At step S840, the processor 600 checks if the terminal TE is active. The terminal T E is active when it is powered on and in idle mode or when it is under communication with a remote telecommunication device.

If the terminal TE is not active, the processor 600 returns to step S840. Otherwise, the processor 600 moves to step S841.

At step S841, the processor 600 resets a list of potential base stations BS. The list of potential base stations BS intends to comprise the identifiers of the base stations BS which can handle the terminal TE. A reset of the list of potential base stations BS creates the list with all surrounding base stations BS identifiers, e.g. given from the active set of candidate base stations BS if any active set is available or given from.

At next step S842, the processor 600 commands the channel interface 605 to execute some quality measurements on downlink signals. The channel interface 605 measures the signals transferred, e.g. in each measurement channel, by the base stations BS it can find and keeps the base stations BS for which the quality measurement is upper than a predetermined value.

At next step S843, the processor 600 ranks the kept base stations BS according to the instant of reception of the signal they respectively transferred from the first one to the last one in the list of potential base stations BS.

At next step S844, the processor 600 selects one of the base stations BS in the list of potential base stations BS.

At next step S845, the processor 600 commands the transfer of a signal to the selected base station BS. The signal is as example a RACH message which may comprise a report of the quality measurements made at step S842.

At step S846, the processor 600 checks if the selected base station BS denied to handle the terminal TE. The terminal TE is notified of that deny by receiving a rejection message from the base station BS or by not receiving a message representative of an acceptance to handle the terminal TE within a predetermined time period or by receiving a request to proceed to an handover from the base station BS to another base station BS.

If the selected base station BS denied to handle the terminal TE, the processor 600 moves to step S848. Otherwise, the base station BS moves to step S847.

At step S847, the processor 600 registers that the selected base station BS handles the terminal TE and interrupts the present algorithm.

At step S848, the processor 600 identifies the selected base station BS as a base station BS which can not handle the terminal TE and removes the identifier of the base station BS from the list of potential base stations BS.

At the same step, the processor 600 identifies each base station BS which has a lower rank, i.e. which has been received with a higher time of reception, than the selected base station BS, the cell of which having an idle period with same or smaller duration than the duration of the idle period of the cell of the base station BS, as a base station BS which can not handle the terminal TE. The processor 600 removes the identifier of each base station BS which has a lower rank than the selected base station BS from the list of potential base stations BS.

At next step S849, the processor 600 checks if they are some remaining base stations BS in the list of potential base stations BS.

If they are some remaining base stations BS in the list of potential base stations BS, the processor 600 returns to step S844. Otherwise, the processor 600 returns to step S841.

Figure 8D:
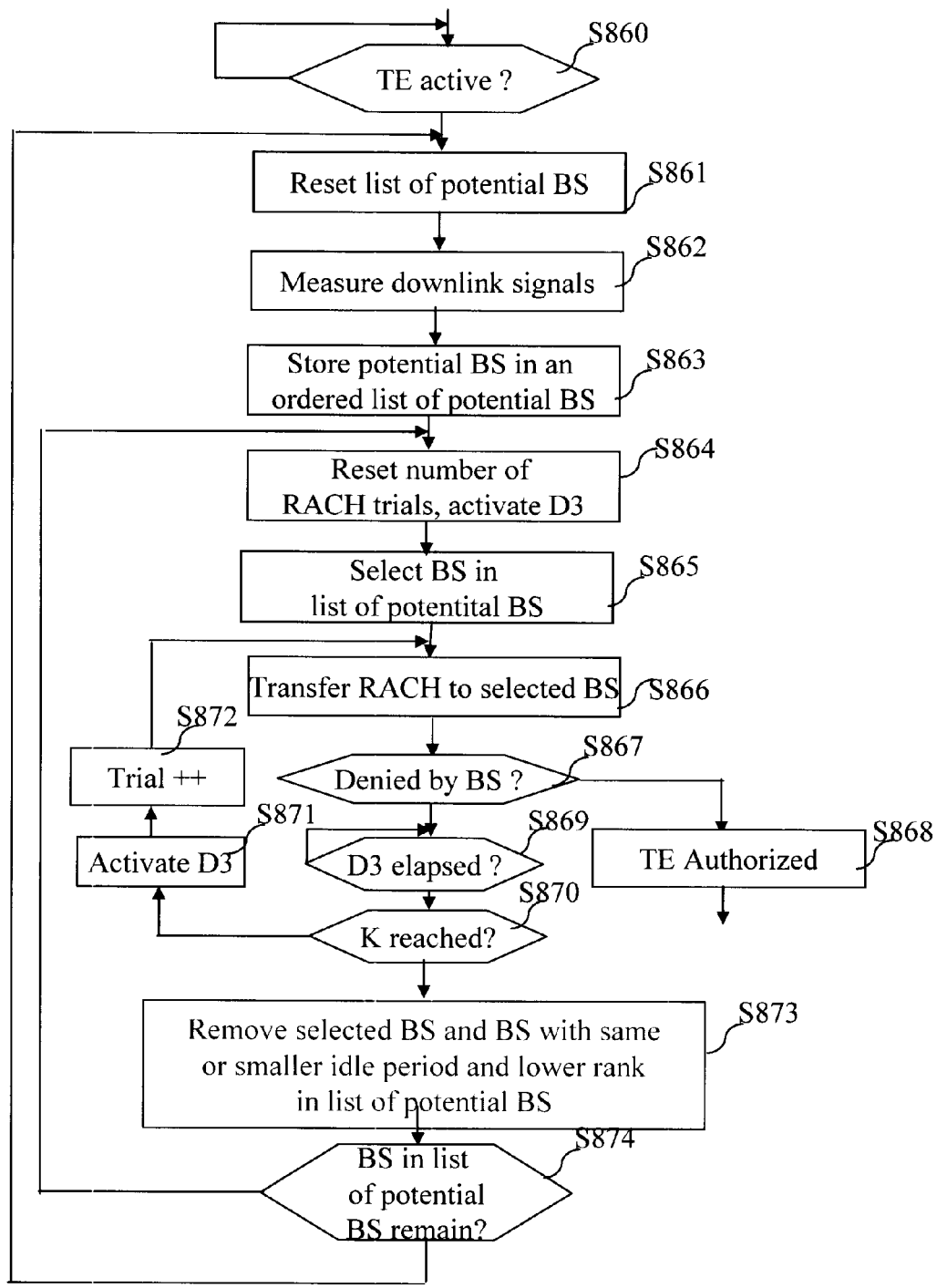
FIG. 8d is an example of an algorithm executed by a terminal according to a fourth mode of realisation of the present invention.

FIG. 8*d* is an example of an algorithm executed by a terminal according to the fourth mode of realisation of the present invention.

The present algorithm is more precisely executed by the processor 600 of each terminal TE when the wireless cellular telecommunication network is cell-synchronised.

In cell-synchronised networks, the order of arrival of the downlink messages transferred by base stations BS can be used for ranking the base stations BS according to their distance from the terminal TE.

The fourth mode of realisation takes advantageously profit of that characteristic.

At step S860, the processor 600 checks if the terminal TE is active. The terminal T E is active when it is powered on and in idle mode or when it is under communication with a remote telecommunication device.

If the terminal TE is not active, the processor 600 returns to step S860. Otherwise, the processor 600 moves to step S861.

At step S861, the processor 600 resets a list of potential base stations BS. The list of potential base stations BS intends to comprise the identifiers of the base stations BS which can handle the terminal TE.

At next step S862, the processor 600 commands the channel interface 605 to execute some quality measurements on downlink signals. The channel interface 605 measures the signals transferred, e.g. in each measurement channel, by the base stations BS it can find.

At next step S863, the processor 600 ranks the kept base stations BS according to the instant of reception of the signal they respectively transferred from the first one to the last one in the list of potential base stations BS.

At next step S864, the processor 600 resets a number of transmissions of signals in response to the downlink signals received at step S862 and activates a timer D3 as the one disclosed at step S823 of the FIG. 8*b*.

At next step S865, the processor 600 selects one of the base stations BS in the list of potential base stations BS.

At next step S866, the processor 600 commands the transfer of a signal to the selected base station BS. The signal is as example a RACH message which may comprise a report of the quality measurements made at step S862.

At step S867, the processor 600 checks if the selected base station BS denied to handle the terminal TE. The terminal TE is notified of that deny by not receiving a message representative of an acceptance to handle the terminal TE within a predetermined time period.

If the selected base station BS denied to handle the terminal TE, the processor 600 moves to step S869. Otherwise, the base station BS moves to step S868.

At step S868, the processor 600 registers that the selected base station BS handles the terminal TE and interrupts the present algorithm.

At step S869, the processor 600 checks if the time duration D3 is elapsed. As far as the time duration D3 is not elapsed, the processor 600 stays at step S869. If the time duration D3 is elapsed, the processor 600 moves to step S870.

At step S870, the processor 600 checks if the number of trials is equal to a predetermined value noted K.

If the number of trials is not equal to a predetermined value noted K, the processor 600 moves to step S871 and activates the time duration D3.

At next step S872, the processor 600 increments the number of trials and returns to step S866.

If the number of trials is equal to the predetermined value noted K, the processor 600 moves to step S873.

At step S873, the processor 600 identifies the selected base station BS as a base station BS which can not handle the terminal TE and removes the identifier of the base station BS from the list of potential base stations BS.

At the same step, the processor 600 identifies each base station BS which has a lower rank than the selected base station BS, the cell of which having an idle period with same or smaller duration than the duration of the idle period of the cell of the base station BS, as a base station BS which can not handle the terminal TE. The processor 600 removes the identifier of each base station BS which has a lower rank than the selected base station BS from the list of potential base stations BS.

At next step S874, the processor 600 checks if they are some remaining base stations BS in the list of potential base stations BS.

If they are some remaining base stations BS in the list of potential base stations BS, the processor 600 returns to step S864. Otherwise, the processor 600 returns to step S861.

Naturally, many modifications can be made to the embodiments of the invention described above without departing from the scope of the present invention.

The invention claimed is:

1. A method for determining, in a wireless cellular telecommunication network, whether a base station can handle a half-duplex terminal, the base station transferring signals in a cell of the base station, and the half-duplex terminal, when being handled by the base station, not transferring and not receiving signals during a period of time, called idle period of the cell of the base station, the method being executed by the base station and comprising:

transferring a signal to the half-duplex terminal in the cell of the base station;

receiving a signal transferred by the half-duplex terminal in response to the signal transferred by the base station;

determining from the received signal, a characteristic of the half-duplex terminal in the cell;

comparing the characteristic of the half-duplex terminal to the idle period and determining whether the characteristic of the half-duplex terminal is compatible with the idle period based on a result of the comparing; and determining that the base station is unable to handle the half-duplex terminal in response to the characteristic of the half-duplex terminal in the cell not being compatible with the idle period.

2. The method according to claim 1, wherein the wireless telecommunication network uses half duplex Frequency Division Duplexing scheme and only half-duplex terminals handled by the base station do not transfer and do not receive signals during the idle period of the cell of the base station or the half-duplex terminals handled by the base station and the base station do not transfer and do not receive signals during the idle period.

3. The method according to claim 1, wherein the wireless telecommunication network uses Time Division Duplexing scheme and the half-duplex terminals handled by the base station and the base station do not transfer and do not receive signals during the idle period.

4. The method according to claim 2 or 3, wherein the characteristic of the half-duplex terminal is the delay between the transfer of the signal to the half-duplex terminal by the base station and the reception by the base station of the signal transferred by the half-duplex terminal to the base station in response to the signal being transferred to the half-duplex terminal by the base station.

5. The method according to claim 4, wherein the determination of the compatibility of the characteristic of the half-duplex terminal with the idle period is executed by checking whether the received signal is received within a predetermined time.

6. The method according to claim 2 or 3, wherein the characteristic of the terminal in the cell is the distance separating the terminal and the base station.

7. A base station of a wireless cellular telecommunication network able to determine whether the base station can handle a half-duplex terminal, the base station transferring signals in a cell of the base station, and the half-duplex terminal, when being handled by the base station, not transferring and not receiving signals during a period of time, called idle period of the cell of the base station, the base station comprising:

means for transferring a signal to the half-duplex terminal in the cell of the base station;

means for receiving a signal transferred by the half-duplex terminal in response to the signal transferred by the base station;

means for determining from the received signal, a characteristic of the half-duplex terminal in the cell;

means for comparing the characteristic of the half-duplex terminal to the idle period and for determining whether the characteristic of the half-duplex terminal is compatible with the idle period based on a result of the comparing; and means for determining that the base station is unable to handle the half-duplex terminal in response to the characteristic of the half-duplex terminal in the cell not being compatible with the idle period.

8. A non-transitory computer-readable storage medium storing computer readable instructions thereon which, when executed by a computer, cause the computer to perform a method for determining, in a wireless cellular telecommunication network, whether a base station can handle a half-duplex terminal, the base station transferring signals in a cell of the base station, and the half-duplex terminal, when being handled by the base station, not transferring and not receiving signals during a period of time, called idle period of the cell of the base station, the method being executed by the base station and comprising:

transferring a signal to the half-duplex terminal in the cell of the base station;

receiving a signal transferred by the half-duplex terminal in response to the signal transferred by the base station;

determining from the received signal, a characteristic of the half-duplex terminal in the cell;

comparing the characteristic of the half-duplex terminal to the idle period and determining whether the characteristic of the half-duplex terminal is compatible with the idle period based on a result of the comparing; and determining that the base station is unable to handle the half-duplex terminal in response to the characteristic of the half-duplex terminal in the cell not being compatible with the idle period.

9. The method according to claim 1, wherein the base station transfers to the half-duplex terminal a message rejecting the half-duplex terminal in response to the characteristic of the half-duplex terminal in the cell not being compatible with the idle period.

10. The base station according to claim 7, further comprising means for transferring to the half-duplex terminal a message rejecting the half-duplex terminal in response to the characteristic of the half-duplex terminal in the cell not being compatible with the idle period.

* * * * *